(12) United States Patent
Mehr et al.

(10) Patent No.: US 8,935,366 B2
(45) Date of Patent: Jan. 13, 2015

(54) HYBRID DISTRIBUTED AND CLOUD BACKUP ARCHITECTURE

(75) Inventors: John D. Mehr, Kenmore, WA (US); Elissa E. S. Murphy, Seattle, WA (US); Navjot Virk, Bellevue, WA (US); Lara M. Sosnosky, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 440 days.

(21) Appl. No.: 12/430,010

(22) Filed: Apr. 24, 2009

(65) Prior Publication Data

US 2010/0274982 A1    Oct. 28, 2010

(51) Int. Cl.
*G06F 15/177*    (2006.01)
*G06F 15/173*    (2006.01)
*G06F 11/14*    (2006.01)
*H04L 29/08*    (2006.01)

(52) U.S. Cl.
CPC ........... *H04L 67/104* (2013.01); *H04L 67/1095* (2013.01); *H04L 67/1023* (2013.01); *H04L 67/1076* (2013.01); *G06F 11/1464* (2013.01); *G06F 11/1453* (2013.01); *G06F 11/1458* (2013.01); *H04L 67/1051* (2013.01); *H04L 67/101* (2013.01); *H04L 67/1008* (2013.01)
USPC ............ 709/220; 709/223; 709/224; 711/162

(58) Field of Classification Search
USPC ................................................. 709/220, 224
See application file for complete search history.

(56) References Cited

U.S. PATENT DOCUMENTS

| 5,239,647 | A | * | 8/1993 | Anglin et al. ........................ 1/1 |
| 5,410,671 | A | | 4/1995 | Elgamal et al. |
| 5,701,480 | A | | 12/1997 | Raz |
| 5,924,096 | A | | 7/1999 | Draper et al. |
| 5,987,506 | A | | 11/1999 | Carter |
| 6,167,427 | A | | 12/2000 | Rabinovich et al. |
| 6,256,675 | B1 | * | 7/2001 | Rabinovich ................... 709/241 |
| 6,405,219 | B2 | | 6/2002 | Saether et al. |
| 6,463,454 | B1 | | 10/2002 | Lumelsky et al. |
| 6,466,980 | B1 | | 10/2002 | Lumelsky et al. |
| 6,516,350 | B1 | * | 2/2003 | Lumelsky et al. ............. 709/226 |
| 6,728,849 | B2 | | 4/2004 | Kodama |

(Continued)

FOREIGN PATENT DOCUMENTS

| GB | 2439195 A | * 12/2007 | .............. H04L 29/08 |
| JP | 200659308 A | 9/1994 | |

(Continued)

OTHER PUBLICATIONS

Translation of JP 2005-201248-A, Ichikawa, Hiroyuk (Jan. 2007).*

(Continued)

*Primary Examiner* — Emmanuel L Moise
*Assistant Examiner* — Robert Shaw
(74) *Attorney, Agent, or Firm* — Bryan Webster; David Andrews; Micky Minhas

(57) ABSTRACT

The claimed subject matter provides a system and/or a method that facilitates integration of a distributed backup environment and a online backup environment. A super peer device can be designated from a set of peer devices. The super peer can distribute backup data amongst the set of peer devices based upon availability and storage capacity of the peer devices. In addition, the super peer can transfer portions of backup data from the set of peers to an online backup service.

17 Claims, 10 Drawing Sheets

(56) References Cited

U.S. PATENT DOCUMENTS

| | | | |
|---|---|---|---|
| 6,785,786 B1* | 8/2004 | Gold et al. | 711/162 |
| 6,880,002 B2 | 4/2005 | Hirschfeld | |
| 6,950,871 B1 | 9/2005 | Honma et al. | |
| 7,020,665 B2 | 3/2006 | Douceur et al. | |
| 7,023,974 B1 | 4/2006 | Brannam et al. | |
| 7,054,910 B1 | 5/2006 | Nordin et al. | |
| 7,103,740 B1* | 9/2006 | Colgrove et al. | 711/162 |
| 7,136,903 B1 | 11/2006 | Phillips et al. | |
| 7,155,463 B1 | 12/2006 | Wang et al. | |
| 7,159,050 B2 | 1/2007 | Miyata et al. | |
| 7,219,191 B2 | 5/2007 | Takamoto et al. | |
| 7,334,062 B1 | 2/2008 | Agarwal et al. | |
| 7,370,336 B2 | 5/2008 | Husain et al. | |
| 7,383,381 B1 | 6/2008 | Faulkner et al. | |
| 7,392,421 B1 | 6/2008 | Bloomstein et al. | |
| 7,461,230 B1* | 12/2008 | Gupta et al. | 711/170 |
| 7,529,785 B1* | 5/2009 | Spertus et al. | 1/1 |
| 7,539,708 B2 | 5/2009 | Oosaki et al. | |
| 7,636,764 B1* | 12/2009 | Fein et al. | 709/212 |
| 7,653,668 B1* | 1/2010 | Shelat et al. | 707/610 |
| 7,657,582 B1* | 2/2010 | Cram et al. | 707/640 |
| 7,685,109 B1* | 3/2010 | Ransil et al. | 707/999.003 |
| 7,693,877 B1* | 4/2010 | Zasman | 707/707 |
| 7,739,233 B1* | 6/2010 | Ghemawat et al. | 707/610 |
| 7,761,456 B1 | 7/2010 | Cram et al. | |
| 7,783,600 B1* | 8/2010 | Spertus et al. | 707/622 |
| 7,805,407 B1 | 9/2010 | Verbeke et al. | |
| 7,827,214 B1 | 11/2010 | Ghemawat et al. | |
| 7,836,017 B1 | 11/2010 | Srinivasan et al. | |
| 7,925,623 B2 | 4/2011 | Therrien et al. | |
| 7,941,619 B1* | 5/2011 | Rossi | 711/162 |
| 2002/0055972 A1 | 5/2002 | Weinman, Jr. | |
| 2002/0107877 A1 | 8/2002 | Whiting et al. | |
| 2002/0156974 A1* | 10/2002 | Ulrich et al. | 711/114 |
| 2003/0056139 A1 | 3/2003 | Murray et al. | |
| 2003/0105810 A1* | 6/2003 | McCrory et al. | 709/203 |
| 2003/0110263 A1 | 6/2003 | Shillo | |
| 2003/0135514 A1 | 7/2003 | Patel et al. | |
| 2003/0167295 A1 | 9/2003 | Choo | |
| 2003/0177176 A1* | 9/2003 | Hirschfeld et al. | 709/203 |
| 2003/0212872 A1* | 11/2003 | Patterson et al. | 711/165 |
| 2004/0003107 A1 | 1/2004 | Barham et al. | |
| 2004/0030731 A1 | 2/2004 | Iftode et al. | |
| 2004/0047354 A1 | 3/2004 | Slater et al. | |
| 2004/0049700 A1 | 3/2004 | Yoshida | |
| 2004/0064633 A1 | 4/2004 | Oota | |
| 2004/0088331 A1 | 5/2004 | Therrien et al. | |
| 2004/0122741 A1* | 6/2004 | Sidman | 705/26 |
| 2004/0193659 A1* | 9/2004 | Carlson et al. | 707/204 |
| 2004/0210591 A1 | 10/2004 | Hirschfeld et al. | |
| 2005/0108565 A1 | 5/2005 | Blea et al. | |
| 2005/0120058 A1* | 6/2005 | Nishio | 707/200 |
| 2005/0132257 A1 | 6/2005 | Gold et al. | |
| 2005/0144195 A1* | 6/2005 | Hesselink et al. | 707/201 |
| 2005/0154697 A1 | 7/2005 | Altaf et al. | |
| 2005/0193239 A1* | 9/2005 | Shackelford | 714/7 |
| 2005/0246398 A1 | 11/2005 | Barzilai et al. | |
| 2005/0262097 A1 | 11/2005 | Sim-Tang et al. | |
| 2005/0283487 A1 | 12/2005 | Karlsson et al. | |
| 2006/0010169 A1 | 1/2006 | Kitamura | |
| 2006/0064416 A1* | 3/2006 | Sim-Tang | 707/6 |
| 2006/0149901 A1* | 7/2006 | Sasage et al. | 711/114 |
| 2006/0161635 A1 | 7/2006 | Lamkin et al. | |
| 2006/0167784 A1* | 7/2006 | Hoffberg | 705/37 |
| 2006/0168154 A1 | 7/2006 | Zhang et al. | |
| 2006/0179061 A1* | 8/2006 | D'Souza et al. | 707/10 |
| 2006/0230076 A1 | 10/2006 | Gounares et al. | 707/200 |
| 2006/0242155 A1 | 10/2006 | Moore et al. | |
| 2006/0253504 A1 | 11/2006 | Lee et al. | |
| 2006/0265490 A1 | 11/2006 | Pishevar et al. | |
| 2006/0271530 A1 | 11/2006 | Bauer | |
| 2006/0271601 A1* | 11/2006 | Fatula et al. | 707/201 |
| 2007/0027916 A1 | 2/2007 | Chen et al. | |
| 2007/0043787 A1* | 2/2007 | Cannon et al. | 707/203 |
| 2007/0078809 A1* | 4/2007 | Semkow et al. | 707/2 |
| 2007/0079004 A1 | 4/2007 | Tatemura et al. | |
| 2007/0083725 A1 | 4/2007 | Kasiolas et al. | |
| 2007/0087756 A1* | 4/2007 | Hoffberg | 455/450 |
| 2007/0094269 A1 | 4/2007 | Mikesell et al. | |
| 2007/0113032 A1* | 5/2007 | Kameyama et al. | 711/162 |
| 2007/0136541 A1 | 6/2007 | Herz et al. | |
| 2007/0143371 A1 | 6/2007 | Kottomtharayil | |
| 2007/0207729 A1 | 9/2007 | Chen et al. | |
| 2007/0208748 A1* | 9/2007 | Li | 707/10 |
| 2007/0244894 A1* | 10/2007 | St. Jacques | 707/9 |
| 2007/0244920 A1* | 10/2007 | Palliyil et al. | 707/102 |
| 2007/0245103 A1 | 10/2007 | Lam et al. | |
| 2007/0250519 A1 | 10/2007 | Fineberg et al. | |
| 2007/0294719 A1 | 12/2007 | Jost | |
| 2008/0005114 A1* | 1/2008 | Li | 707/9 |
| 2008/0005334 A1 | 1/2008 | Utard et al. | 709/226 |
| 2008/0052328 A1 | 2/2008 | Widhelm et al. | 707/204 |
| 2008/0062886 A1* | 3/2008 | Tang et al. | 370/252 |
| 2008/0065704 A1* | 3/2008 | MacCormick et al. | 707/204 |
| 2008/0104107 A1 | 5/2008 | Schwaab et al. | |
| 2008/0147836 A1* | 6/2008 | Littlefield et al. | 709/223 |
| 2008/0178179 A1* | 7/2008 | Natarajan et al. | 718/102 |
| 2008/0183891 A1* | 7/2008 | Ni et al. | 709/239 |
| 2008/0198752 A1* | 8/2008 | Fan et al. | 370/238 |
| 2008/0209144 A1 | 8/2008 | Fujimoto | |
| 2008/0215663 A1 | 9/2008 | Ushiyama | |
| 2008/0222154 A1* | 9/2008 | Harrington et al. | 707/10 |
| 2008/0222346 A1* | 9/2008 | Raciborski et al. | 711/102 |
| 2008/0235331 A1* | 9/2008 | Melamed et al. | 709/204 |
| 2008/0256138 A1 | 10/2008 | Sim-Tang | |
| 2008/0301132 A1 | 12/2008 | Yamada et al. | |
| 2008/0317068 A1* | 12/2008 | Sagar et al. | 370/503 |
| 2009/0007241 A1 | 1/2009 | Tewari | |
| 2009/0164533 A1 | 6/2009 | Hubbard | |
| 2009/0182955 A1* | 7/2009 | Cherukuri | 711/141 |
| 2009/0198825 A1* | 8/2009 | Miller et al. | 709/230 |
| 2009/0222498 A1 | 9/2009 | Lu et al. | |
| 2009/0234917 A1* | 9/2009 | Despotovic et al. | 709/204 |
| 2009/0265473 A1* | 10/2009 | Hydrie et al. | 709/229 |
| 2009/0276771 A1 | 11/2009 | Nickolov et al. | |
| 2009/0292871 A1 | 11/2009 | Watanabe et al. | |
| 2009/0300079 A1* | 12/2009 | Shitomi | 707/204 |
| 2010/0023722 A1* | 1/2010 | Tabbara et al. | 711/170 |
| 2010/0034211 A1* | 2/2010 | Yanagihara | 370/408 |
| 2010/0094967 A1* | 4/2010 | Zuckerman et al. | 709/219 |

FOREIGN PATENT DOCUMENTS

| | | | | |
|---|---|---|---|---|
| JP | 2003-280950 | | 10/2003 | |
| JP | 2004046874 A | * | 12/2004 | G06F 13/00 |
| JP | 2005-215735 | | 8/2005 | |
| JP | 2006-350470 | | 12/2006 | |
| JP | 200701840 A | | 1/2007 | |
| JP | 2007018407 A | | 1/2007 | |
| WO | 2004/053696 | | 6/2004 | |
| WO | 2007088084 A2 | | 8/2007 | |

OTHER PUBLICATIONS

Ripeanu and Foster, A Decentralized, Adaptive Replica Location Mechanism, Proceedings of the 11th IEEE International Symposium on High Performance Distributed Computing (HPDC-11), 2002.*

Kaczmarski, Jiang & Pease, "Beyond backup toward storage management", IBM Systems Journal, vol. 42, No. 2, 2003, pp. 322-337.*

L. Garcés-Erice et al. "Hierarchical P2P Systems," ACM/IFIP Conference on Parallel and Distributed Computing (Euro-Par), 2003.*

L. Qiu, V. Padmanabhan, and G. Voelker. On the Placement of Web Server Replicas. In Proceedings of IEEE INFOCOM, Apr. 2000, pp. 1587-1596.*

Dilley et al. "Globally Distributed Content Delivery", IEEE Internet Computing, IEEE (Sep.-Oct. 2002) p. 50-58.*

Jorden, E., Project prioritization and selection: the disaster scenario, In Proceedings of the 32nd Annual Hawaii International Conference on Systems Sciences (HICSS-32), Maui, Hawaii, Jan. 1999.*

Abawajy, Placement of File Replicas in Data Grid Environment ICCS 2004, LNCS 3038, Springer-Verlag, 2004. pp. 66-73.*

(56) References Cited

OTHER PUBLICATIONS

Hoschek, W., Janez, F. J., Samar, A., Stockinger, H., Stockinger, K.: Data Managementin an International Data Grid Project, Proceedings of GRID Workshop (2000) 77-90.*
Androutsellis-Theotokis and Spinellis, A Survey of Peer-to-Peer Content Distribution Technologies, ACM Computing Surveys, vol. 36, No. 4, Dec. 2004, pp. 335-371.*
Loukopoulos and Ahmad, "Static and adaptive distributed data replication using genetic algorithms" in Journal of Parallel Distributed Computing 64 (2004) pp. 1270-1285.*
Ripeanu & Foster, A Decentralized, Adaptive Replica Location Mechanism, Proceedings of the 11th IEEE International Symposium on High Performance Distributed Computing (HPDC-11), 2002.*
Li-ECSP: An Efficient Clustered Super-Peer Architecture for P2P Networks, MS Thesis, University of British Columbia, Aug. 2003.*
Sanchez-Artigas et al., "A Comparative Study of Hierarchical DHT Systems" in: 32nd IEEE Conference on Local Computer Networks, IEEE (2007).*
J. Kangasharju, K.W. Ross, and D.A. Turner. Optimal Content Replication in P2P Communities, 2002.*
Karlsson and Karamanolis, Choosing Replica Placement Heuristics for Wide-Area Systems, in: Proceedings of the 24th International Conference on Distributed Computing Systems (ICDCS'04), IEEE, 2004.*
Chu et al—Optimal File Allocation in a Multiple Computer System, IEEE Transactions on Computers, vol. C-18, No. 10, Oct. 1969, pp. 885-889.*
Ranganathan et al, "Improving Data Availability through Dynamic Model-Driven Replication in Large Peer-to-Peer Communities", Proceedings of the 2nd IEEE/ACM International Symposium on Cluster Computing and the Grid (CCGRID.02) (2002).*
Ranganathan and Foster, "Identifying Dynamic Replication Strategies for a High-Performance Data Grid", LNCS 2242, Springer-Verlag, 2001, pp. 75-86.*
Stockinger, H., Samar, A., Allcock, B., Foster, I., Holtman, K., Tierney, B.: File and Object Replication in Data Grids, 10th IEEE Symposium on High Performance and Distributed Computing (2001).*
Tierney et al "A Monitoring Sensor Management System for Grid Environments", Cluster Computing No. 4, 2001 pp. 19-28.*
Tran et al—Grid Resource Management Based on Functional Dependency, in: EUC 2006, LNCS 4096, SpringerLink (2006) pp. 365-374.*
Xiao et al, Distributed Proximity-Aware Peer Clustering in BitTorrent-Like Peer-to-Peer Networks, in: EUC 2006, LNCS 4096, SpringerLink (2006) pp. 375-384.*
Song et al, Hierarchical and Dynamic Information Management Framework on Grid Computing, in: EUC 2006, LNCS 4096, SpringerLink (2006) pp. 151-161.*
LoPresti et al—Dynamic Replica Placement in Content Delivery Networks, Proceedings of the 13th IEEE International Symposium on Modeling, Analysis, and Simulation of Computer and Telecommunication Systems (MASCOTS'05), IEEE (2005).*
Szymaniak et al, Latency-Driven Replica Placement, IPSJ Journal (Aug. 2006).*
Tang et al "Sorrento: A Self-Organizing Storage Cluster for Parallel Data-Intensive Applications", UCSB Tech Report 2003-30, (2003).*
Tang & Yang, Differentiated Object Placement and Location for Self-organizing Storage Clusters, UCSB Tech Report 2002-32, (2002).*
Oracle DB Backup in the Cloud (Sep. 2008).*
Dowdy and Foster, "Comparative Models of the FileAssignment Problem," ACM Computer Surveys, vol. 14, No. 2, 1982 pp. 287-313.*
Tewari & Adam, "Distributed File Allocation with Consistency Constraints", Proceedings of the International Conference on Distributed Computing Systems (1992).*
Mahmoud and Riordon, "Optimal Allocation of Resources in Distributed Information Networks," ACM Transactions on Database Systems, vol. 1, No. 1, Mar. 1976, pp. 66-78.*

Qiu et al—On the Placement of Web Server Replicas. In Proceedings of IEEE INFOCOM, Apr. 2000, pp. 1587-1596.*
Androutsellis-Theotokis et al, A Survey of Peer-to-Peer Content Distribution Technologies ACM Computing Surveys, vol. 36, No. 4, (Dec. 2004).*
Karlsson et al A Framework for Evaluating Replica Placement Algorithms, HP Tech.Report HPL-2002-219 (Aug. 2002).*
Mao et al. "QoS oriented dynamic replica cost model for P2P computing," Distributed 25th IEEE International Conference on Computing Systems Workshops, Jun. 2005.*
On et al. "QoS-Controlled Dynamic Replication in Peer-to-Peer Systems", Proceedings of Third International Conference on Peer-to-Peer Computing, 2003.*
Garcés-Erice "Hierarchical Peer-to-Peer Systems".Euro-Par 2003, LNCS 2790,(2003) pp. 1230-1239.*
Zhipeng & Dan, Dynamic Replication Strategies for Object Storage Systems in: EUC Workshops 2006, LNCS 4097, SpringerLink (2006) pp. 53-61.*
Jesi et al, Proximity-Aware Superpeer Overlay Topologies, SelfMan 2006, LNCS 3996, (2006) pp. 43-57.*
Androutsellis-Theotokis and D. Spinellis, A Survey of Peer-to-Peer Content Distribution Technologies, ACM Computing Surveys, vol. 36, No. 4, Dec. 2004, pp. 335-371.*
Oracle, Oracle Database Backup in the Cloud, http://www.oracle.com/technology/tech/cloud/pdf/cloud-backup-whitepaper.pdf, 12 pages, Sep. 2008.
Barr, et al., pStore: A Secure Distributed Backup System, http://kbarr.net/static/pstore/progress.pdf, 10 pages.
Distributed Version Control and Library Metadata, http://journal.code4lib.org/articles/86, last accessed Jan. 22, 2009, 9 pages.
Peer-to-Peer Replication, http://publib.boulder.ibm.com/infocenter/db2luw/v9r5/index.jsp?topic=/com.ibm.swg.im.iis.repl.qrepl.doc/topics/iiyrqsubcp2pconc.html, last accessed Jan. 22, 2009, 5 pages.
Auvray,Distributed Version Control Systems: A Not-So-Quick Guide Through, http://www.infoq.com/articles/dvcs-guide, last accessed Jan. 22, 2009, 18 pages.
Stefansson, MyriadStore: A Peer-to-Peer Backup System, http://myriadstore.sics.se/docs/mstorethesis.pdf, Jun. 2006, 2006, 86 pages.
Li, et al., Erasure Resilient Codes in Peer-to-Peer Storage Cloud, http://ieeexplore.ieee.org/stamp/stamp.jsp?arnumber=01660948 4 pages.
DFSgc: Distributed File System for Multipurpose Grid Applications and Cloud Computing, http://www.cyfronet.pl/cgw08/presentations/c2-4.pdf, 18 pages.
Harris, De-duplicating Primary Storage, http://storagemojo.com/2008/09/30/de-duplicating-primary-storage/, last accessed on Jan. 22, 2009 18 pages.
Graham, Cloud Optimized Storage Solutions: Neural Networks and Heuristics, http://flickerdown.com/2009/01/cloud-optimized-storage-solutions-neural-networks-and-heuristics/, Jan. 19, 2009, 10 pages.
Storage Optimization, http://storageoptimization.wordpress.com/, last accessed on Jan. 22, 099 9 pages.
Backup, the New Storage Tiers and Real Snapshots, http://blogs.netapp.com/extensible_netapp/iops/index.html, Dec. 15, 2008, 5 pages.
Distributed Backup Solution for Corporate Networks, http://www.handybackup.net/distributed-backup-system.shtml, last accessed on Jan. 22, 099 2 pages.
Douceour, Large-scale Simulation of Replica Placement Algorithms for a Sewerless Distributed File System, http://ieeexplore.ieee.org/stamp/stamp.jsp?arnumber=948882&isnumber=20512, Jan. 22, 2009, 10 pages.
McCue, et al., Computing Replica Placement in Distributed Systems, http://ieeexplore.ieee.org/stamp/stamp.jsp?arnumber=242617&isnumber=6238, Jan. 22, 2009, 4 pages.
MacCormick, et al., Kinesis: A New Approach to Replica Placement in Distributed Storage Systems, http://research.microsoft.com/pubs/76149/Kinesis.pdf, 14 pages.
Yu, et al., Minimal Replication Cost for Availability, http://www.comp.nus.edu.sg/~yuhf/podc02.pdf, 10 pages.

(56) References Cited

OTHER PUBLICATIONS

Chen, et al. SCAN: A Dynamic, Scalable, and Efficient Content Distribution Network, http://sahara.cs.berkeley.edu/papers/CKK02b.ps, 15 pages.
Presti, et al. Dynamic Replica Placement in Content Delivery Networks, http://ieeexplore.ieee.org/stamp/stamp.jsp?arnumber=01521155, 10 pages.
Chun, et al. Efficient Replica Maintenance for Distributed Storage Systems, http://oceanstore.cs.berkeley.edu/publications/papers/pdf/carbonite06.pdf, 14 pages.
Notice of Allowance and Fee(s) Due mailed Jul. 22, 2013 in U.S. Appl. No. 12/430,018; 4 pages.
Ye & Chiu, Peer-to-Peer Replication with Preferences, InfoScale 2007, Jun. 6-8, 2007, Suzhou, China, ACM (2007).
Final Office Action mailed Jun. 5, 2013 in U.S. Appl. No. 12/430,015; 102 pages.
Non-Final Office Action mailed Nov. 5, 2012 in U.S. Appl. No. 12/430,012; 452 pages.
Tang & Yang, Technical Report 2002-32, UCSB, Nov. 2002.
Karlson et al., A Framework for Evaluating Replica Placement Algorithms, HP Tech Report PHL-2002-219 (Aug. 2002), 13 pages.
Bartolini et al. Optimal Dynamic Replica Placement in Content Delivery Networks, pp. 125-130 (6 pages).
Xiao et al., Distributed Proximity—Aware Peer Clustering in BioTorrent-Like Peer-to-Peer Networks, E. Sha et al. (eds.): EUC 2006, LNCS 4096, pp. 375-384, 2006.
Chandy et al., File Allocation in Distributed Systems, Joint International Conference on Measurement and Modeling of Computer Systems Proceedings of the 1976 ACM SIGMETRICS conference on Computer Performance Modeling Measurement and Evaluation, Cambridge, MA, 1976, pp. 10-13.
Rabinovich et al., Dynamic Replication on the Internet Work Project No. 3116-17-1706, AT&T Labs Research, p. 1-35.
Rabinovich et al., RaDaR: a scalable architecture for a global Web hosting service, Computer Networks 31 (1999) 1545-1561.
Casey, Allocation of a File in an Information Network, Proceedings of the May 16-18, 1972, Spring Joint Computer Conference (Atlantic City, NJ May 16-18, 1972). AFIPS '72 (Spring)m ACM, New York, NY, pp. 617-625.
Mahmoud, et al., Optimal Allocation of Resources in Distributed Information Networks, ACM Transactions on Database Systems, vol. 1, No. 1, Mar. 1976, pp. 66-78.
Non-Final Office Action mailed Nov. 7, 2012, 504 pages.
Final Office Action mailed Nov. 30, 2012 in U.S. Appl. No. 12/430,018; 356 pages.
Final Office Action mailed Jun. 21, 2013 in U.S. Appl. No. 12/430,012; 112 pages.
Japanese Office Action dated Jan. 15, 2014 re 2012-507360,3 pages.
Japanese Office Action dated Dec. 25, 2013 re App. No. 2012-507361.
Notice of Allowance mailed Feb. 20, 2014, U.S. Appl. No. 12/430,015, 99 pages.
Tang & Yang, Differentiated Object Placement for Self-Organizing Storage Clusters, Technical Report 2002-32, UCSB, (Nov. 2002).
Tang et al—Sorrento: A Self-Organizing Storage Cluster for Parallel Data-Intensive Applications, Technical Report 2003-30, UCSB, (2003).
Kangasharju, Ross & Turner—Adaptive content management in Structured P2P Communities, International Conference on Scalable Information Systems, Hong Kong (2006).
Phan et al. "Evolving Toward the Perfect Schedule: Co-scheduling Job Assignments and Data Replication in Wide-Area Systems Using a Genetic Algorithm," 11th Workshop on Job Scheduling Strategies for Parallel Processing, Cambridge Mass., Jun. 2005.
Zhao et al., Tapestry: An Infrastructure for Fault-tolerant Wide Area Location and Routing, Report No. UCB/CSD-01-1141, Apr. 2001.
Tewari & Adam, Distributed File Allocation with Consistency Constraints, IEEE, Proceedings of the Internaitonal Conference on Distributed Computer (1992), pp. 408-415.
Weatherspoon et al., Introspective Failure Analysis: Avoiding Correlated Failures in Peer-to-Peer Systems, IEEE (2002).
Dimakis et al., Nortwork Cording for Distributed Systems (Mar. 2008).
Szymaniak et al, "Latency-Driven Replica Placement", IPSJ Journal, (Aug. 2006) source: http://www.globule.org/publi/LDRP_ipsj2006.html.
Feng Mao; Hai Jin; Deqin Zou; Baoli Chen; Li Qi;, "QoS Oriented Dynamic Replica Cost Model for P2P Computing," Distributed 25th IEEE International Conference on Computing Systems Workshops, Jun. 6-10, 2005 pp. 822-828.
Ellard et al., Attribute-Based Prediction of File Properties, Tech. Report TR-14-03, Harvard University, Cambridge, MA, 2004.
Ye and Chiu, Peer-to_Peer Replication With Preferences, Infoscale 2007 Jun. 6-8, 2007, Suzhou, China, ACM, 2007.
On et al, "Quality of Availability: Replica Placement for Widely Distributed Systems", Proceedings of the 11th International Conference on Quality of Service (IWQoS2003), Lecture Notes in Computer Science 2707 Springer-Verlag (2003), pp. 324-352.
Rabin, "Efficient Dispersal of Information for Security, Load Balancing, and Fault Tolerance", Journal of the Association for Computing Machinery, vol. 36, No. 2, Apr. 1989, pp. 335-348.
Dowdy and Foster, Comparative Models of the File Assignment Problem, Computing Survey, vol. 14, No. 2, ACM, Jun. 1982, 287-303.
Karlsson and Karamanolis, "Bounds on the Replication Cost for QoS" Technical Report HPL-2003-156, Hewlett Packard Labs, Jul. 2003.
Tang and Yang, Differentiated Object Placement for Self-Organizing Storage Cluster, UCSB, 2002.
Compellent Technologies Inc. Datasheet of Data Progression Storage Center, 2008, http://www.mgbsinc.com/NEWSITEFILES/Compellent/MGBS-Compellent-Data Progression-2008.pdf.
Final Office Action mailed Mar. 26, 2012 re U.S. Appl. No. 12/430,015, 70 pages.
Office Action mailed May 23, 2011 re U.S. Appl. No. 12/430,018, 96 pages.
Office Action mailed Jun. 21, 2011 re U.S. Appl. No. 12/430,015, 83 pages.
Final Office Action mailed Feb. 1, 2012 re U.S. Appl. No. 12/430,018, 100 pages.
Office Action mailed Jun. 18, 2012 re U.S. Appl. No. 12/430,018, 97 pages.
Office Action mailed May 26, 2011 re U.S. Appl. No. 12/430,012, 89 pages.
Final Office Action mailed Apr. 13, 2012 re U.S. Appl. No. 12/430,012, 72 pages.
PCT Appl. No. PCT/US2010/031942, Search Report Dated Nov. 8, 2010, 3 pages.
PCT Appl. No. PCT/US2010/031939, Search Report Dated Nov. 30, 2010, 4 pages.
PCT/Appl. No. PCT/US2010/031939 Written Opinion, dated Nov. 30, 2010, 5 pages.
PCT/Appl. No. PCT/US2010/031939 International Preliminary Report on Patentability, dated Oct. 25, 2011, 6 pages.
PCT/App. No. PCT/US2010/031942, Written Opinion, dated Nov. 8, 2010, 4 pages.
PCT/App. No. PCT/US2010/031942, International Preliminary Report on Patentability, dated Oct. 25, 2011, 5 pages.

* cited by examiner

HYBRID DISTRIBUTED AND CLOUD BACKUP ARCHITECTURE

BACKGROUND

A large and ever-growing amount of computer software is readily available to consumers in light of a dramatic increase in use, demand, availability, and decrease in cost associated with computers. Based on such a vast and broad functionality associated with computers, computer software exists for essentially any market, activity, computation, and/or computer-related implementation. For instance, software can be related to accounting, word processing, data management, electronic mail message, virus protection, data synchronization, digital photograph manipulation, media management, Operating Systems (OS), update control, audio, graphic design, architecture, taxes, browsers, document readers, games, communications, security, networking, etc.

With the advent of highly sophisticated computer software and/or hardware, servicing areas associated therewith have stormed into existence in order to meet consumer high-demands. Typically, computational services are undertaken upon a client or within a proprietary intranet. Client-side systems are employed to manage relationships between users, software applications, services, and hardware within a client machine, as well as data resident upon a respective intranet. However, in addition to client-side systems providing services, off-site systems (e.g., third party) can also provide services in order to improve data capability, integrity, reliability, versioning, security, and mitigate costs associated therewith.

In general, these services can be employed to manage relationship between users, provide software applications, enhance hardware capabilities, manage data, optimize security, etc. For example, a third party service can enable a client to store data therewith limited solely by the third party capabilities (e.g., hardware, software, etc.). In particular, the off-site or remote data storing services enable users to access data storage via the Internet or the web for data upload or download. Typical off-site or online service storage providers require users or clients to individually transfer data resulting in inefficient utilization of bandwidth and storage resources.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate integration of a distributed backup environment and a cloud backup environment. A super peer can be selected from among a plurality of peers. The super peer can manage the plurality of peers and/or data retained by the plurality of peers in accordance with a distributed backup model. In addition, the super peer can interact with online storage to enable off-site or remote backup capabilities. Thus, the super peer effectuates a distributed backup model in relation to the plurality of peers and a cloud backup model in relation to online storage.

Moreover, a hybrid peer-to-peer/cloud backup system can monitor peers and/or data retained on peers. The hybrid system can render decisions regarding distribution of backup data across peers and/or online storage. For instance, the hybrid system can allocate backup data based upon peer availability, peer reliability, peer resources, and/or characteristics of the data (e.g., frequency of access, age of data, etc.). Thus, the subject innovation can distribute backup data among one or more peer devices and online storage such that storage, retrieval, availability and reliability of backup data are optimized. In other aspects, methods are provided that facilitate promotion of peers to super peers and distribution of data across peers and online storage.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
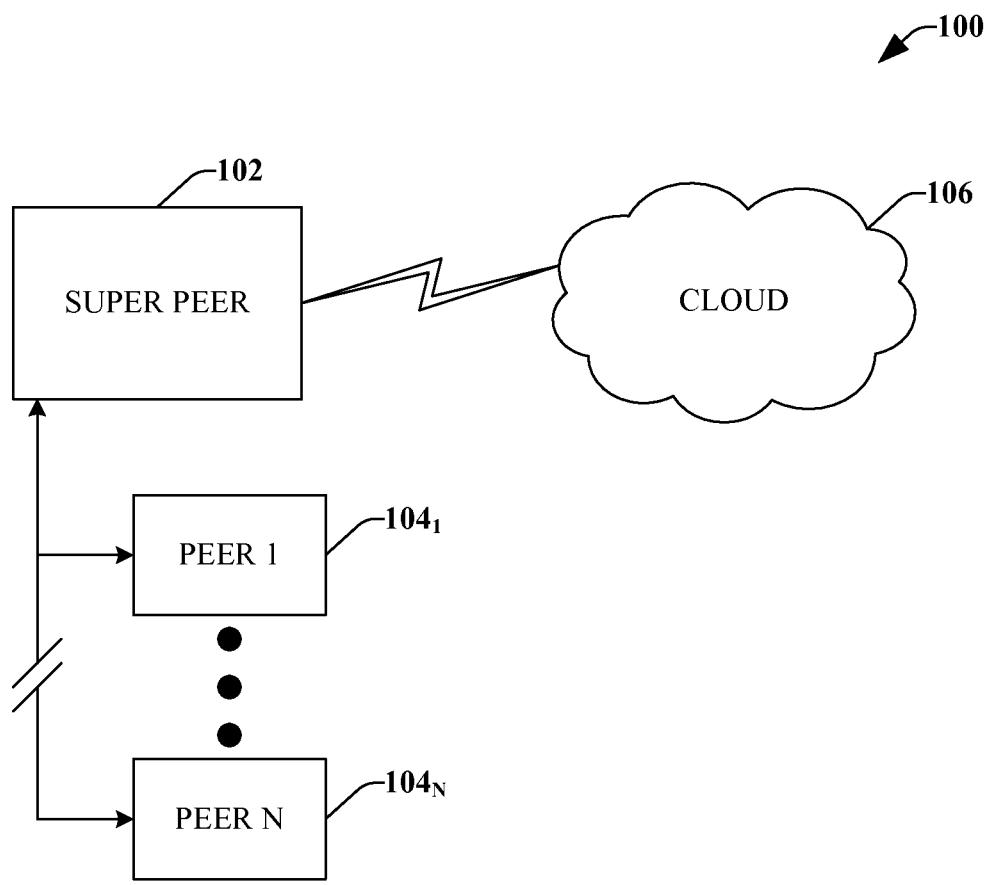
FIG. 1 illustrates a block diagram of an exemplary system that facilitates integration of a distributed backup scheme with an online backup model.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "cloud," "peer," "super peer," "client," and the like are intended to refer to a computer-related entity, either hardware, software in execution on hardware, and/or firmware. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Now turning to the figures, FIG. 1 illustrates a system 100 that facilitates integration of a distributed (e.g., peer to peer) backup model with an online backup scheme. System 100 includes a super peer 102 that can manage a distributed backup environment among one or more peers, such as peers 104. The super peer 102 can interact with cloud 106 (e.g., interact with cloud 106 as a peer) to facilitate cloud backup of data. In an aspect, peers 104 and super peer 102 can be computing devices such as personal computers, servers, laptops, portable digital assistants (PDAs), mobile devices, smart phones, cellular devices, portable gaming devices, media players or any other suitable devices that can retain, manipulate and transfer data.

Super peer 102 can facilitate distributed backup of data across super peer 102 and peers 104. With distributed backup models, backup data (e.g., files, information and/or data desired to be incorporated into a backup) is retained in a distributed manner amongst a set of devices or peers. The set of peers can be organized in a home network, a local area network (LAN), a wide area network (WAN), an intranet, an overlay network or the Internet. While, for simplicity of explanation, only one super peer and one peer are depicted in FIG. 1, it should be understood that aspects disclosed herein can be employed with any number of super peers and/or peers.

Super peer 102 can allocate portions of backup data to various peers such as, for example, peers 104. Backup data can originate from super peer 102, peers 104 and/or any other peer associated with the distributed backup environment. Portions of backup data can be delineated at various levels. For instance, backup data can be divided at a file level in which a portion of backup data includes one or more individual files. It is to be appreciated that other division schemes can be employed. For example, backup data can be partitioned in blocks or chunks of data in which a block can include data comprising a part of a file, parts of two or more files, a file and a part of a second file, a file and parts of two or more files, and so on.

In another example, backup data that is segmented can be aggregated and/or stored on the super peer 102 to effectuate efficient transmission to other locations of system 100 (e.g., peers 104, cloud 106, etc.). For instance, peers 104 can employ the super peer 102 as a data de-duplication location to transmit less data to other parts of system 100. In addition, de-duplication can reduce overall amount of backup data stored by system 100. In yet another example, processing tasks associated with backup data can be spread across peers 104 with optionally optimization provided by the super peer 102. For instance, compression of backup data can occur at peers 104 (e.g., given that sufficient CPU resources are available and/or backup data is close). In an aspect, peers 104 can de-duplicate backup data prior to replication to super peer 102. The super peer 102 can compress de-duplicated data prior to transmission to the cloud 106 and/or other peers 104.

Peers in a distributed backup environment (e.g., super peer 102, peers 104, and any other peers (not shown)) can be prioritized. Backup data can be distributed among peers based at least in part on peer priority. For example, high priority peers can retain more portions of backup data than low priority peers. A priority can be assigned to a peer based upon evaluation of characteristics of the peer. In one aspect, characteristics can include availability (e.g., communicative availability), storage capacity, locality, connectivity, bandwidth, processing capacity, memory capacity, and other hardware resource capabilities. According to an example, a peer with abundant storage capacity, high connectivity, and large bandwidth can be prioritized higher than a peer with limited storage that is infrequently available.

Super peer 102 can monitor data (e.g., backup data) to optimize data distributions in terms of restoration latency, bandwidth utilization, and reliability. For instance, frequently accessed data (e.g., "Hot" data) can be distributed and retained among local peers to provide locality that enables quicker restoration times (e.g., faster retrieval). Infrequency accessed data or "cold" data can be distributed to more remote locations such as cloud 106.

Super peer 102 can communicate with cloud 106 to effectuate an online backup scheme. Super peer 102 can interact with cloud 106 on behalf of peer 104 and/or as a write-through cache for peers 104. For example, peers 104 and super peer 102 can individually shift data to cloud 106 in conventional online backup systems. Independent movement of data to cloud 106 can lead to inefficiencies when similar data is redundantly transferred to and retained by cloud 106. Super peer 102 can provide a single conduit for peers 104 to cloud 106 to reduce redundant communication and storage of backup data. Super peer 102, in addition to managing distribution of backup data amongst peers, can shift backup data to cloud 106 for reliable storage.

It is to be appreciated that the cloud 106 can include any suitable component, device, hardware, and/or software associated with the subject innovation. Cloud 106 can refer to any collection of resources (e.g., hardware, software, combination thereof, etc.) that are maintained by a party (e.g., off-site, on-site, third party, etc.) and accessible by an identified user (not shown) over a network (e.g., Internet, wireless, LAN, cellular, Wi-Fi, WAN, etc.). Cloud 106 is intended to include any service, network service, cloud service, collection of resources, etc. and can be accessed by an identified user via a network. For instance, two or more users can access, join, and/or interact with cloud 106 and, in turn, associated storage space in cloud 106.

In another aspect, system 100 can include a content delivery network (CDN) or edge network. For instance, super peer 102 can be a CDN. It is to be appreciated that the CDN can also be one of peers 104 and/or a separate server (not shown). In one example, the CDN can be designated as a super peer or a peer based upon a policy applied in accordance with the manner in which the CDN participates in a backup client quorum. In another example, the CDN can operate as a backup destination (e.g., a storage location). The CDN can be a geographically close storage location such that data can be efficiently retained and accessed. The CDN can also operate as a write-through cache wherein writing of backup data to the cloud 106, super peer 102, or peer 104 can be optimized in terms of route, latency, bandwidth utilization and the like. It is to be appreciated that the CDN can perform substantially similar functions as the super peer 102 and/or peers 104 as described herein.

Figure 2:
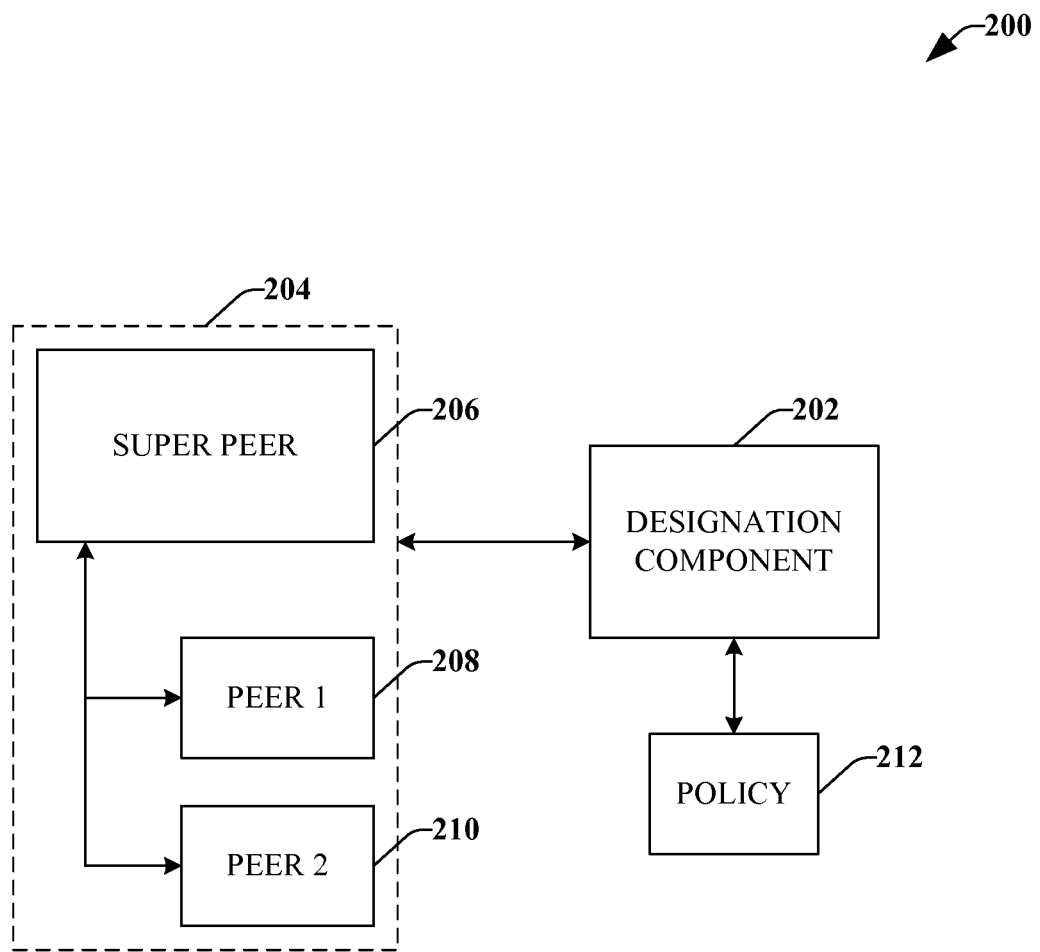
FIG. 2 illustrates a block diagram of an exemplary system that facilitates incorporating online backup with distributed backup in which a super peer is designated from a set of peers.

FIG. 2 illustrates a system 200 that facilitates incorporating online backup with distributed backup in which a super peer is designated from a set of peers. System 200 can include a designation component 202 that selects a peer from a group of peers 204. The designation component 202 promotes the selected peer to a super peer of group 204. For instance, group 204 can include peer 1 208, peer 2 210 and a peer 206 designated as a super peer. While three peers are illustrated in group 204, it is to be appreciated that any number of peers can be included in group 204. Group 204 can include devices (e.g., peers) owned by a particular user, trusted by the user, specified by the user, and/or utilized by the user to retain user data. In one example, peers in group 204 can be communicatively coupled via a network (e.g., home network, intranet, LAN, WAN, Wi-Fi, Internet, etc.). In addition, group 204 can include peers with varying resource capabilities (e.g., memory capacity, processor capability, storage capacity, etc.), and connectivity (e.g., availability and bandwidth).

The designation component 202 evaluates the group of peers 204 to ascertain characteristics of each peer. The characteristics can include availability, network topology, peer location, storage capacity, connectivity, bandwidth, processing capacity, memory capacity, and other hardware resource capabilities. The designation component 202 can prioritize peers in the group 204 based upon the ascertained characteristics. For example, peers with greater storage capacity, higher availability, located closer on a network (e.g., closer locality) and/or abundant bandwidth achieve a higher priority than peers with limited storage capacity, availability or bandwidth.

In an aspect, a highest prioritized peer can be designated as super peer 206. Once designated, super peer 206 can manage distribution of backup data amongst the group of peers 204. Super peer 206 can monitor peers 208 and 210 as well as backup data to allocate and/or distribute portions of backup data to the peers 208 and 210. In addition, super peer 206 can facilitate transfer of backup data from the group of peers 204 to an online backup system (e.g., cloud 106 from FIG. 1). It is to be appreciated that the designation component 202 can select more than one super peer from the group of peers 204. The multiple super peers can operate in concert for all peers. In addition, a hierarchy of peers can be established. For instance, a first super peer can be associated with a first subset of peers from group 204 and a second super peer can be associated with a second subset of peers from group 204. The first and second peers can independently manage distribution of backup data within the associated subsets. In addition, the first and second peers can independently shift backup data to the online backup system.

The designation component 202 can automatically select super peers from a set of peers (e.g., select super peer 206 from group 204) in accordance with priority. In addition, the designation component 202 can utilize a policy 212 to elect a super peer. The policy 212 can include specific rules or processes by which super peers are to be designated. Moreover, the policy 212 can include an explicit election of a super peer in accordance with configuration by a user, for example.

While depicted as a separate entity in FIG. 2, it is to be appreciated that the designation component 202 can be incorporated into the group of peers 204 and/or individual peers 206, 208, or 210. For instance, the designation component 202 can be incorporated in a backup application distributed across all peers in group 204. Each peer can include a backup client (not shown) that evaluates characteristics of the associated peer and generates a priority. The distributed backup clients can exchange generated priorities with other peers and nominate a super peer based upon the exchanged priorities.

Figure 3:
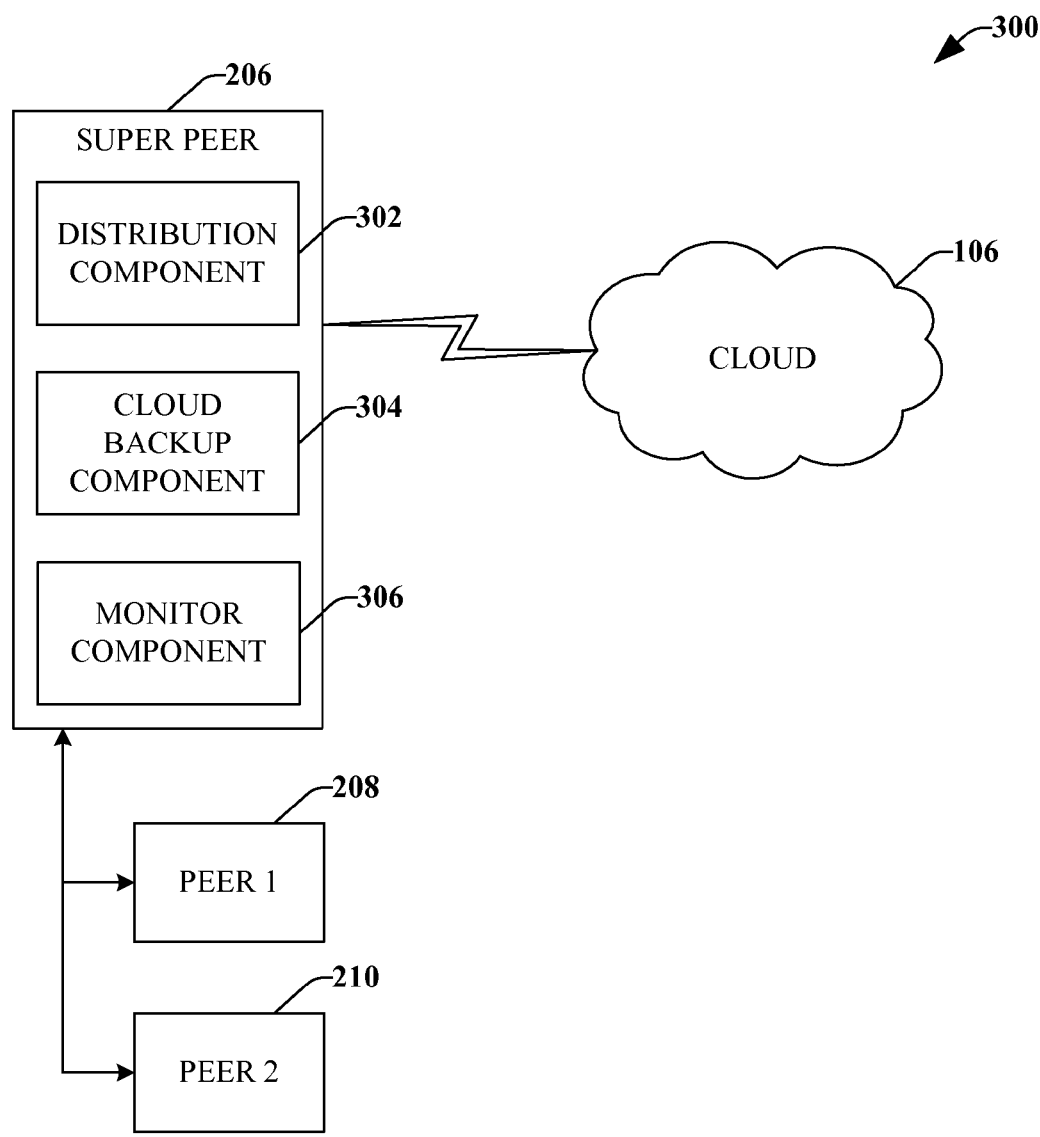
FIG. 3 illustrates a block diagram of an exemplary system that facilitates distributing backup data across peers and an online storage environment.

FIG. 3 illustrates a system 300 that facilitates distributing backup data across peers and an online storage environment. System 300 includes a super peer 206 that facilitates distribution of backup data among one or more peers (e.g., peers 208 and 210). In addition, system 300 includes cloud 106 that provides an online or remote backup environment for super peer 206, peer 208, and peer 210.

Super peer 206 includes a distribution component 302 that manages locality of backup data amongst a set of peers. For example, the set of peers can include super peer 206, peer 208, peer 210, and any other peers associated with super peer 206. The distribution component 302 allocates portions of backup data to various peers wherein each peer retains portions of backup data allocated thereto by the distribution component 302. The distribution component 302 can utilize peer priorities to provision backup data amongst peers, wherein priorities are assigned based upon evaluated characteristics of the peers. The distribution component 302 can distribute a larger portion of backup data to highest priority peers. For instance, the distribution 302 can select to retain a large portion of backup data on super peer 206 as the super peer 206 is a peer having the highest priority (e.g., highest availability, largest storage capacity, greatest resources, etc.).

In accordance with another aspect, the distribution component 302 can dispense the backup data among the set of peers and/or cloud 106 based upon a level of redundancy. In one example, the level of redundancy can indicate that three replica copies of a portion of backup data are to be scattered among the set of peers and/or cloud 106. It is to be appreciated that the level of redundancy can be configurable either automatically by system 300 or by a user to achieve various degrees of redundant storage of backup data. In an aspect, the distribution component 302 can calculate an overall level of redundancy required to achieve reliability. In an example, a particular storage location (e.g., peer, super peer, cloud, etc.) can be optimal in terms of locality to a client machine (e.g., a restoring client machine). However, the storage location can exhibit low availability. Accordingly, the distribution component 302 can select a secondary storage location to retain a redundant copy or copies of backup data stored at the storage location. Such redundancy proves the client machine a guarantee that backup data will be available for restoration from some storage location, if not always the optimal location.

Super peer 206 can include a cloud backup component 304 that facilitates transferring backup data between the set of peers (e.g., super peer 206, peer 208, and peer 210) and the cloud 106. In general, the cloud backup component 204 generates a conduit that allows bi-directional movement of backup data between peers and online data storage of cloud 106. The cloud backup component 204 can shift backup data to cloud 106 during off-peak times. While cloud 106 offers highest reliability in terms of data storage, higher bandwidth is required to transition data and, further, restoration of data from the cloud 106 is coupled with higher latency. In an example, the cloud backup component 304 can transfer backup data to the cloud 106 that is less likely to be accessed or restored by a user (e.g., a user interacting with a peer). In another example, the cloud backup component 304 can shift valuable backup data to the cloud 106 where reliable, long-term storage can be provided.

It is to be appreciated that the peers (e.g., super peer 206, peer 208, and peer 210) and cloud 106 can include a data store that retains at least backup data. The data store can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store of the subject systems and methods is intended to comprise, without being limited to, these and any other suitable types of memory. In addition, it is to be appreciated that the data store can be a server, a database, a hard drive, a pen drive, an external hard drive, a portable hard drive, and the like.

The super peer 206 can include a monitor component 306 that monitors the set of peers 206, 208, and 210. The monitor component 306 can detect changes in characteristics of peers wherein such changes can affect peer priority. In an example, the monitor component 306 can identify a peer experiencing connectivity difficulties that reduces the peer's availability. In another example, the monitor component 306 can detect a peer nearing maximum storage capacity. Further, the monitor component 306 can observe peers with increasing storage capacity and/or availability over time. Such changes can alter priority of a peer as the peer because more or less favorable to retain backup data. The distribution component 302 can evaluate changes in characteristics of peers and modify locality of backup data (e.g., re-distribute) accordingly.

The monitor component 306 can also monitor backup data to effectuate further optimizations. For instance, the monitor component 306 can track hot/cold nature of backup data. Hot data can include data that are frequently accessed, new, more likely to be restored, and the like. In contrast, cold data can include infrequently access data, old data, and/or data least likely to be restored. In accordance with an example, hot data, as established by the monitor component 306, can be distributed among the set of peers to enable quicker access and shorter restoration times. Moreover, locality of hot data among the set of peers can be selected based upon a peer or peers actively accessing the hot data. For instance, hot data can be allocated to peers most likely to access/restore the hot data. In another example, cold data can be transitioned to the cloud 106. The monitor component 306 can observe age of backup data. For example, recently backed up data can include recent versions of files. Users can be more likely to recover latest or recent versions of files as opposed to older versions.

It is to be appreciated that the system 300 can include any suitable and/or necessary interface component (not shown), which provides various adapters, connectors, channels, communication paths, etc. to integrate the distribution component 302, cloud backup component 304, and monitor component 306 into virtually any application, operating and/or database system(s) and/or with one another. In addition, the interface component can provide various adapters, connectors, channels, communication paths, etc., that provide for interaction with and between distribution component 302, cloud backup component 304, and monitor component 306, and any other device (e.g., peers 206, 208, and 210), service (e.g., cloud 106) and/or component associated with the system 300.

Figure 4:
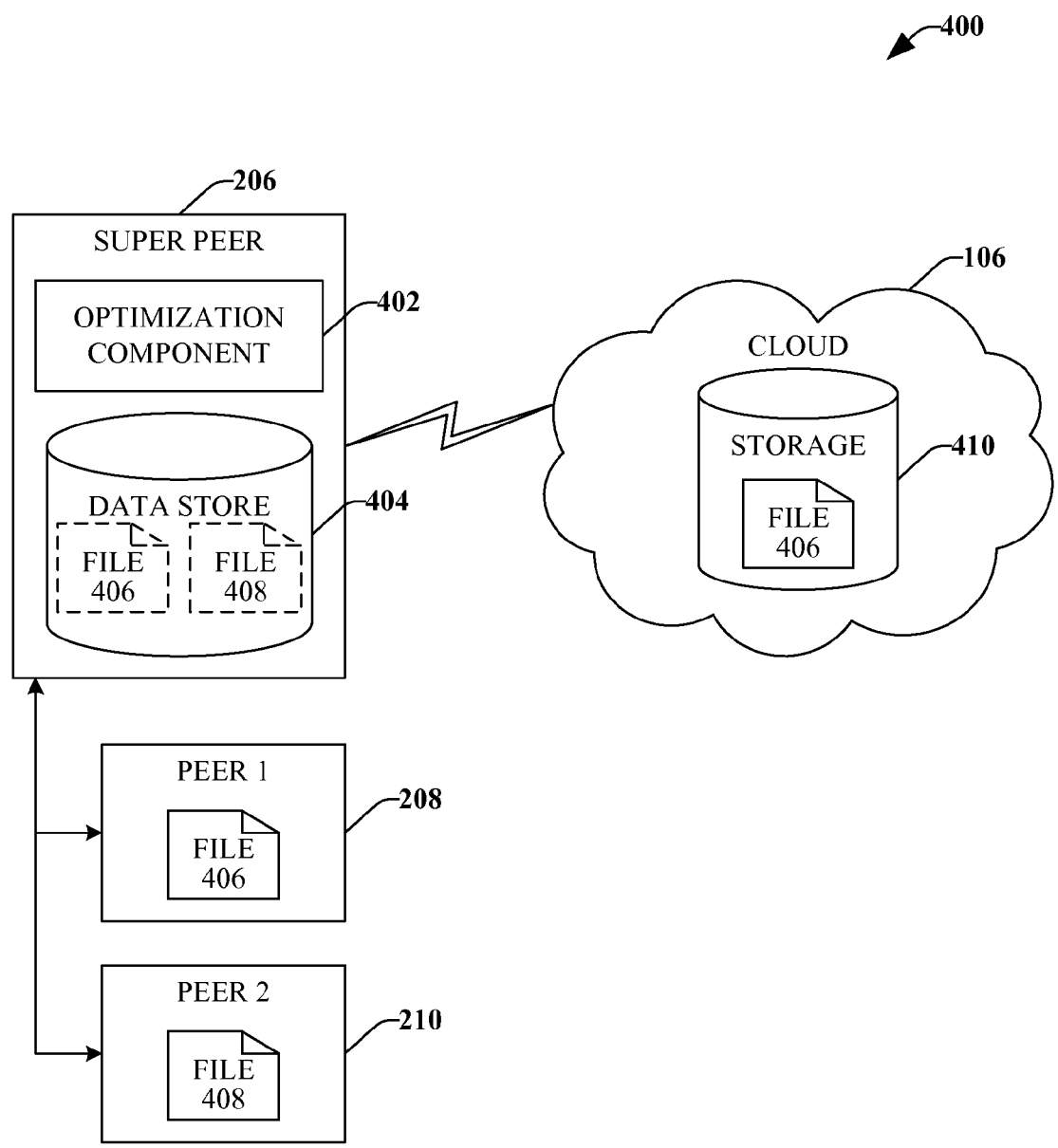
FIG. 4 illustrates a block diagram of an exemplary system that facilitates reducing storage costs associated with an online backup and storage service.

FIG. 4 illustrates a system 400 that facilitates reducing storage costs associated with an online backup and storage service. The system 400 can include the super peer 206 that is associated with a set of peers that includes one or more peers such as peer 208 and peer 210. The super peer 206 manages a distributed backup environment that comprises the associated set of peers and the super peer 206 itself. In an example, the super peer 206 evaluates characteristics of the peers and backup data to provision portions of the backup data amongst the peers. System 400 can also include the cloud 106 that provides online storage of backup data to the peers.

In an aspect, the super peer 206 can act as an intermediary between peers 208 and 210 and the cloud 106. In other words, the super peer 206 can bridge the distributed backup environment of the peers with the online backup environment of the cloud 106. Conventional online backup systems enable user devices (e.g., peers) to independently transfer data to an online data storage system such as the cloud 106. The super peer 206, as an intermediary, can optimize communication and storage of backup data in the cloud 106. For instance, the peers 208 and 210 can primarily interact with the super peer 206 such that a majority of backup data originating from the peers is retained by the super peer 206. As discussed supra, the super peer 206 can manage a distributed environment in which backup data is dispersed among the peers 208 and 210 based upon observations of the peers and/or observations of backup data.

The super peer 206 can also relocate backup data to the cloud 106 and other peers. The super peer 206 can include an optimization component 402 that facilitates reducing bandwidth and storage resource utilization associated with online storage within the cloud 106. The optimization component 402 allows super peer 206 to transfer unique pieces of backup data to cloud 106 and reduce storage employed to retain replicate pieces of backup data from the peers. In other words, the optimization component 402 reduces duplicate (e.g., de-duplicates) pieces of backup data locally at the peers prior to transfer to cloud 106. In another example, the optimization component 402 can employ compression techniques on backup data to further reduce storage resource utilization.

According to an example, peer 208 can retain a file or portion of a file 406 and peer 210 can retain a file or portion of a file 408. Files 406 and 408 can be retained in data stores (not shown) associated, respectively, with peers 208 and 210. The files 406 and 408 can be identical versions or copies of a single file that a user accesses (e.g., edits, views, reads, etc.) on multiple devices (e.g., peers 208 and 210). The peers 208 and 210 can individually backup files 406 and 408, respectively, to super peer 206. The super peer 206 can retain backup files 406 and 408 in data store 404.

Prior to transferring backup data to cloud 106, the optimization component 402 can analyze backup files 406 and 408 retained in data store 404 to detect whether the files are similar (e.g., duplicates). When identical or duplicate files (e.g., located on a local device or super peer as an aggregation of other peers) are discovered, the optimization component 402 can retain one copy of actual data of the duplicate files. It is to be appreciated that metadata associated with duplicate files can remain. For instance, the optimization component 402 can select to maintain file 406 and remove file 408. Accordingly, super peer 206 can transfer one of files 406 or 408 to cloud 106 to reduce resource utilization for storage as well as bandwidth resources during data transfer. For example, super peer 206 can shift file 406 to the cloud 106. Cloud 106 or other peers includes storage 410 that retains backup data (e.g., file 406). A user (e.g., owner) of the set of peers 206, 208 and 210 can have an account or contract with a service provider of cloud 106, wherein the service provider extends online storage resources to the user for backup data. The optimization component 402 can optimize utilization of the online storage resources of cloud 106 by eliminating multiple or replicate copies of backup files retained in the cloud 106.

Figure 5:
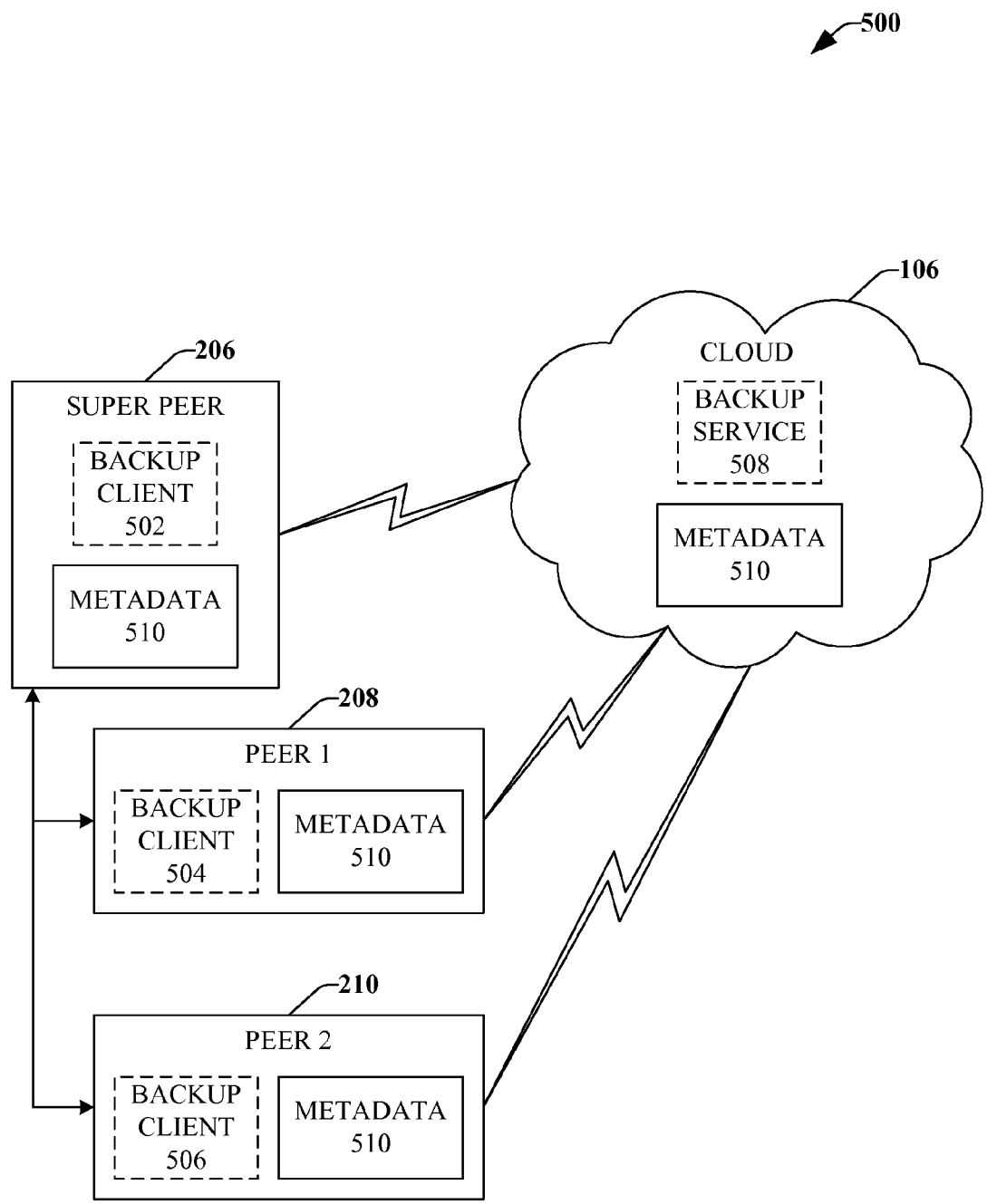
FIG. 5 illustrates a block diagram of an exemplary system that facilitates retrieval and utilization of backup data retained by peers and/or an online backup service in accordance with an aspect of the subject disclosure.

FIG. 5 illustrates a system 500 that facilitates retrieval and utilization of backup data retained by peers and/or an online backup service. System 500 includes a set of peers incorporates at least super peer 206, peer 208 and peer 210. The super peer 206 can facilitate distribution of backup data amongst the set of peers based on availability and storage capacity of the peers. The super peer 206 can also facilitate utilizing an online or remote storage service the cloud 106 to store backup data.

The set of peers can include a distributed backup application. For instance, super peer 206 can include a backup client 502, peer 208 includes backup client 504, and peer 210 includes backup client 506. The backup clients 502, 504, and 506 can coordinate to facilitate distributed storage of backup data amongst the set of peers. The cloud 106 can include a backup service 508 that effectuates online storage of backup data originating from the set of peers.

In an aspect, metadata 510 can be distributed among the set of peers as well as cloud 106. Metadata 510 can include information related to storage of backup data, distribution of backup data, and/or any other data that facilitates management of both a distributed backup environment and an online backup environment. For instance, metadata 510 be a map or index of backup data associated with the set of peers that links portions of backup data with peers that retain the portions. In addition, metadata 510 can include information related to the set of peer devices. In an example, the metadata 510 can include characteristics on availability, storage capacity, and other resource utilization of peer devices. Moreover, metadata 510 can include an index that enables backup clients 502, 504, and 506 and/or backup service 508 to recompose de-duplicated data. For example, metadata 510 can indicate an association between one or more peers and a portion of backup data. The association enables backup client 502 of super peer 206 and/or backup service 508 of the cloud 106 to redistribute backup data to all associated peers upon restoration. It is to be appreciated that metadata 510 can be de-duped and/or single instanced among the set of peers and/or the cloud 106 similar to backup data as discussed supra.

Figure 6:
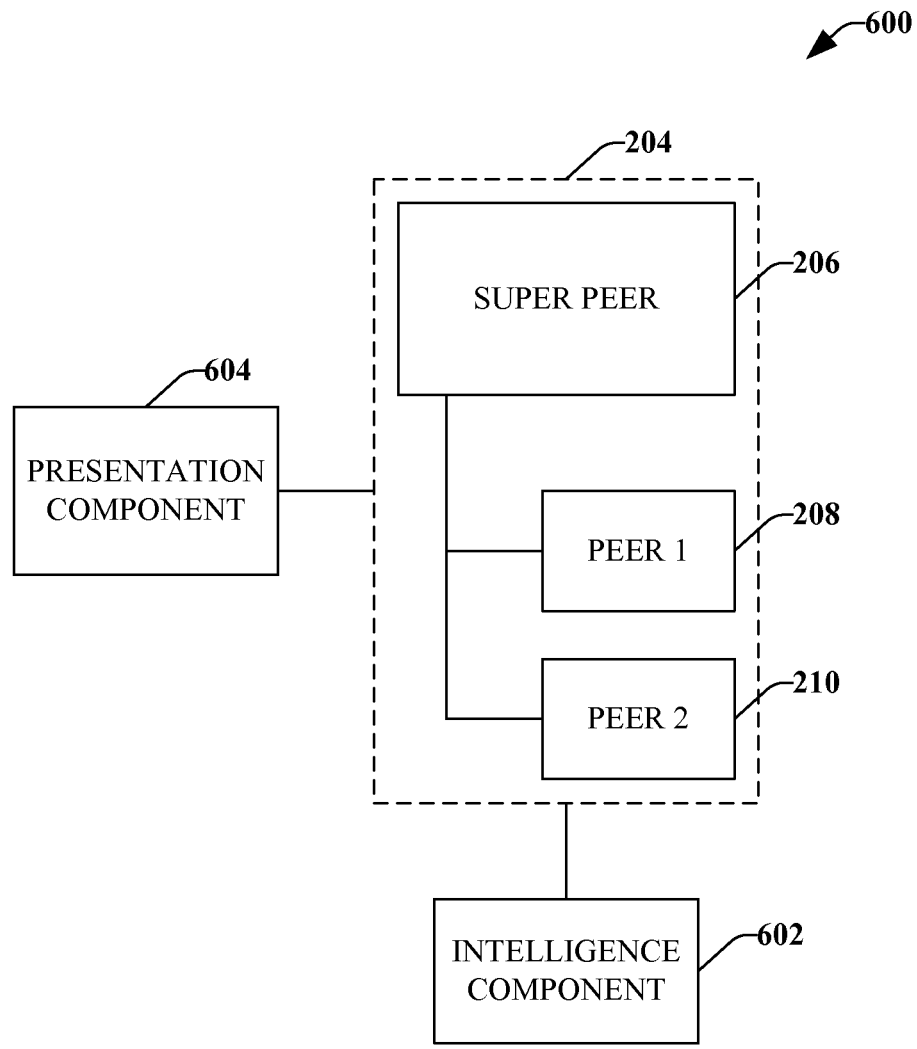
FIG. 6 illustrates a block diagram of an exemplary system that facilitates distribution of backup data among a group of peers and an online storage service.

FIG. 6 illustrates a system 600 that facilitates distribution of backup data among a group of peers and an online storage service. The system 600 can include the group of peers 204, the super peer 206, the peer 208, and the peer 210, which can be substantially similar to respective components, boxes, systems and interfaces described in previous figures. The system 600 further includes an intelligence component 602. The intelligence component 602 can be utilized by the group of peers 204 to facilitate allocation of backup data amongst the group of peers and the online storage service (e.g., cloud 106). For example, the intelligence component 602 can infer peer availability, peer storage capacity, backup data access frequency, backup application settings/configuration, peer priorities, super peer designations, de-duplication mapping information, backup data distributions, etc.

The intelligence component 602 can employ value of information (VOI) computation in order to identify appropriate peers to designate as super peers, to identify optimal allocations of backup data amongst peers and to identify candidate backup data for shifting to the cloud 106. For instance, by utilizing VOI computation, the most ideal and/or appropriate super peer designations and/or backup data allocations can be determined. Moreover, it is to be understood that the intelligence component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The group of peers 204 can further utilize a presentation component 604 that provides various types of user interfaces to facilitate interaction between a user and any component coupled to the group of peers 204 (e.g., backup clients). As depicted, the presentation component 604 is a separate entity that can be utilized with the group of peers 204. However, it is to be appreciated that the presentation component 604 and/or similar view components can be incorporated into the group of peers 204 (e.g., incorporated individually into peers 206, 208 and 210) and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the peers included in the group of peers 204.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
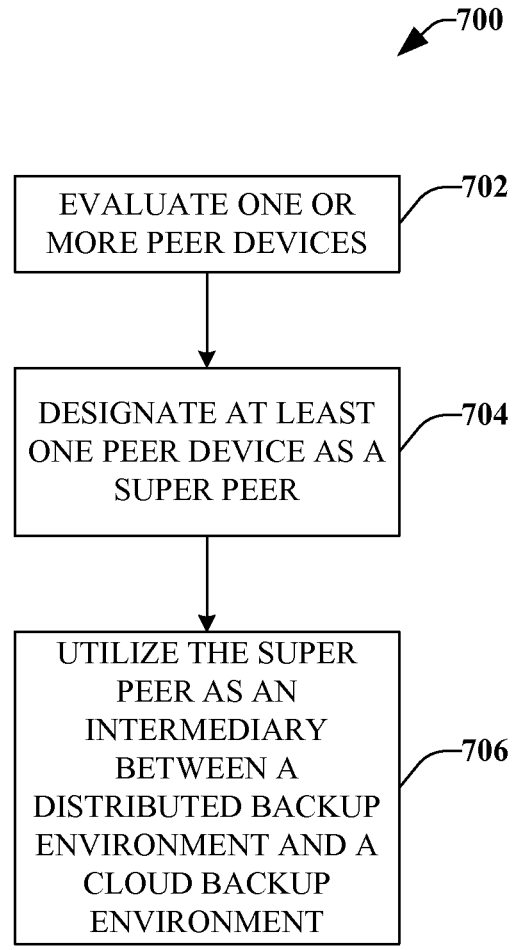
FIG. 7 illustrates an exemplary methodology for designating a peer as a super peer to manage a hybrid backup model.
Figure 8:
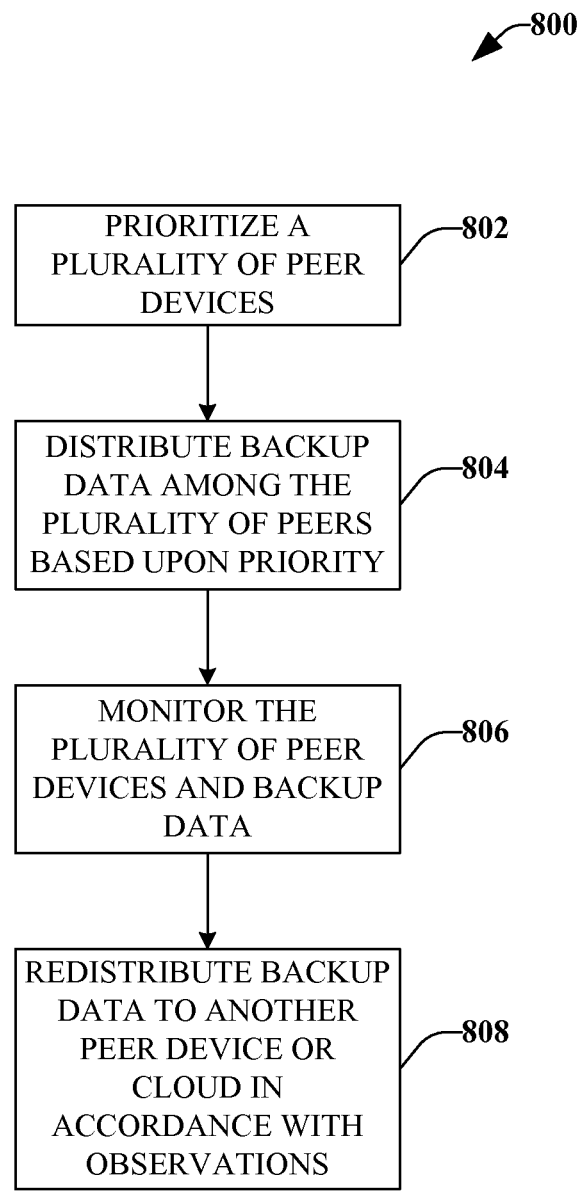
FIG. 8 illustrates an exemplary methodology for monitoring devices and data to effectuate changes in backup data distribution.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates for designating a peer as a super peer to manage a hybrid backup model. At reference numeral 702, one or more peer devices are evaluated. The one or more peer devices can include computing devices such as, but not limited to, personal computers, servers, laptops, portable digital assistants (PDAs), mobile devices, smart phones, cellular devices, cameras, portable gaming devices, media players and the like. The one or more peers can be organized in a home network, a local area network (LAN), a wide area network (WAN), an intranet, the Internet or any other suitable networking hierarchy. The one or more peers can be evaluated to determine characteristics. The characteristics can include features such as, but not limited to, availability, storage capacity (e.g., including external storage devices such as USB drives, external hard drives, etc.), locality, connectivity, bandwidth, processing capacity, memory capacity, and other hardware resource capabilities.

At reference numeral 704, at least one peer of the one or more peers is designated as a super peer. For instance, the one or more peers can be assigned priorities based upon the evaluation of characteristics of the peers. In one example, a peer with abundant storage capacity, high connectivity, and large bandwidth can be prioritized higher than a peer with limited storage and infrequently available. The super peer facilitates distribution of backup data amongst the one or more peers. In other words, the super peer established a distributed backup environment with the one or more peers. At reference numeral 706, the super peer can be utilized as an intermediary between the distributed backup environment and a cloud backup environment. In addition to managing distribution of backup data among the one or more peers, the super peer can remove backup data from the distributed environment and transfer backup data to an online backup storage service in the cloud. The super peer can bridge the one or more peers with the cloud so that the one or more peers are not required to individually backup to the cloud.

FIG. 8 illustrates a method 800 that facilitates monitoring devices and data to effectuate changes in backup data distribution. At reference numeral 802, a plurality of peer devices can be prioritized. For instance, the plurality of peer devices can be prioritized in accordance with evaluated characteristics (e.g., availability, connectivity, storage capacity, bandwidth capacity, etc.). For example, a peer device with higher availability and/or storage capacity can obtain a higher priority than a peer device with low availability and/or limited storage capacity.

At reference numeral 804, backup data can be distributed among the plurality of peer devices according to priority. For example, high priority peers can retain larger portions of backup data than low priority peers. At reference numeral 806, the plurality of peers and backup data can be monitored. For instance, the plurality of peers can be monitored to detect changes in characteristics of the peers wherein such changes can affect assigned priorities. For example, a peer can experience connectivity issues that affect availability and/or a peer can reach maximum storage capacity. In addition, backup data can be monitored to identify likelihood of restoration. For instance, hot/cold nature of backup data can be monitored.

At reference numeral 808, backup data can be redistributed to another peer device or the cloud in accordance with observations. In an example, backup data can be allocated to a peer device whose priority increases. In another example, cold data (e.g., infrequently accessed data) can be transferred to the cloud.

Figure 9:
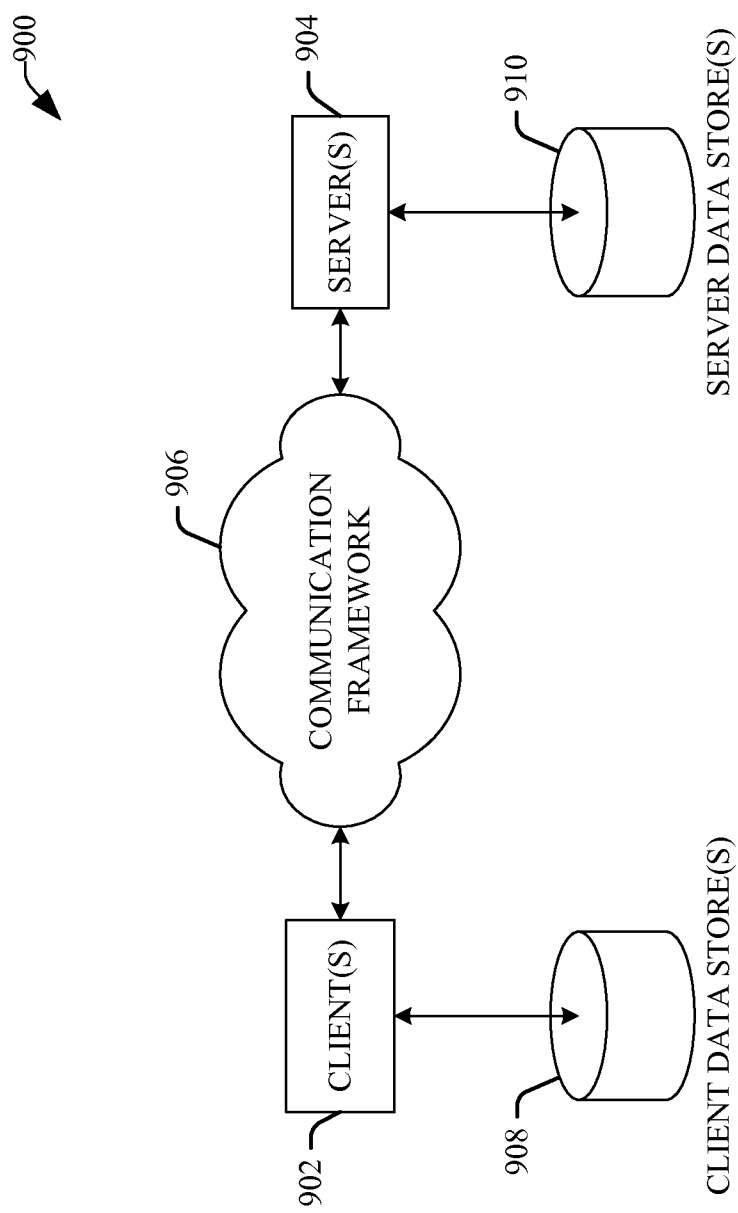
FIG. 9 illustrates an exemplary networking environment, wherein the novel aspects of the claimed subject matter can be employed.
Figure 10:
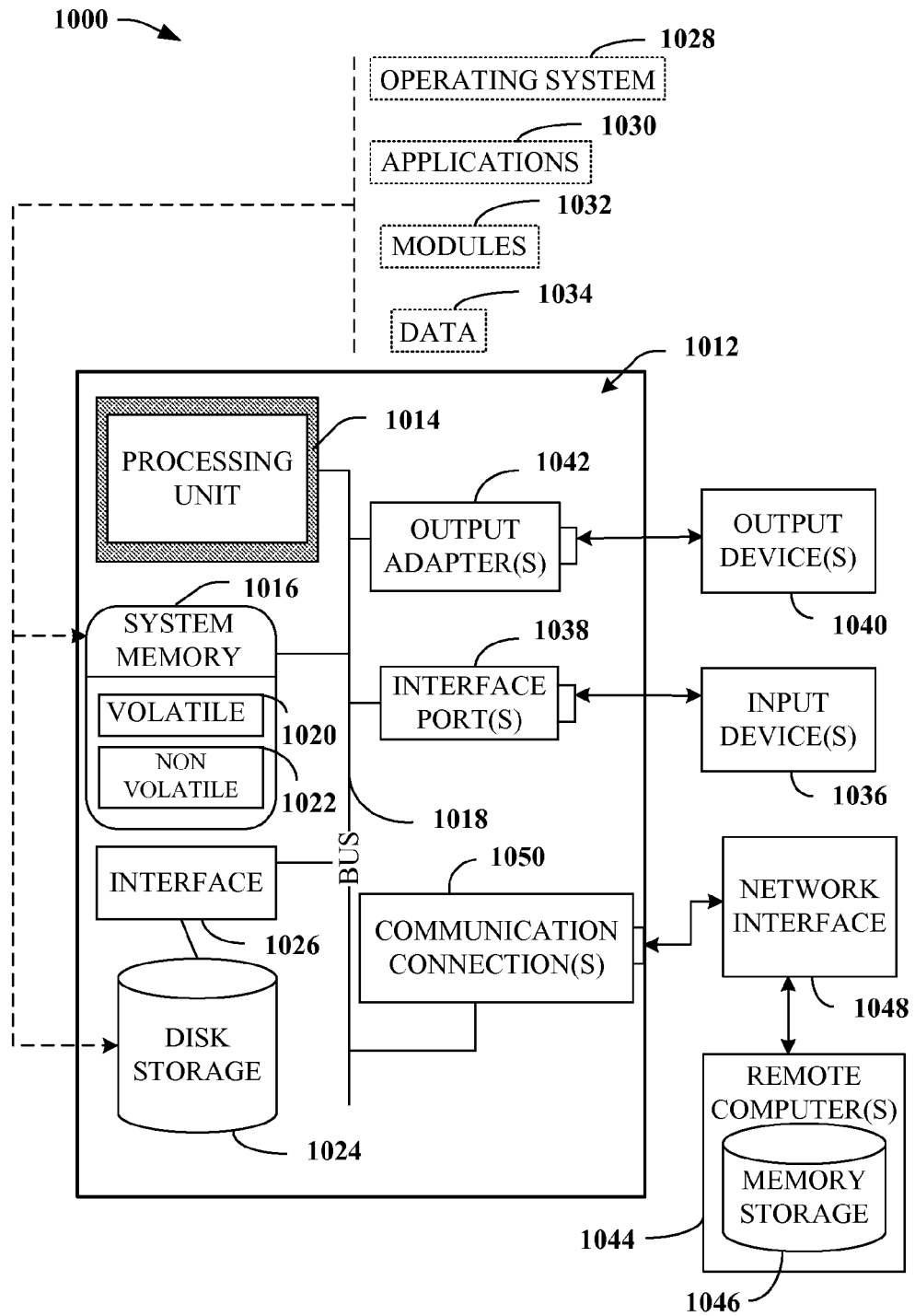
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a super peer that distribute backup data amongst a set of peer and/or the cloud, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 902. The client(s) 902 can be hardware and/or software (e.g., threads, processes, computing devices). The system 900 also includes one or more server(s) 904. The server(s) 904 can be hardware and/or software (e.g., threads, processes, computing devices). The servers 904 can house threads to perform transformations by employing the subject innovation, for example.

One possible communication between a client 902 and a server 904 can be in the form of a data packet adapted to be transmitted between two or more computer processes. The system 900 includes a communication framework 906 that can be employed to facilitate communications between the client(s) 902 and the server(s) 904. The client(s) 902 are operably connected to one or more client data store(s) 908 that can be employed to store information local to the client(s) 902. Similarly, the server(s) 904 are operably connected to one or more server data store(s) 910 that can be employed to store information local to the servers 904.

In an example, the client(s) 902 can be peers and/or super peers as described supra. The client(s) 902 can transmit backup data (e.g., data in client data store(s) 908 desired to be backed up) to server(s) 904 which can be provide online or remote storage for backup data. For example, data from client(s) 902 can be retained in server data store(s) 910.

With reference to FIG. 10, an exemplary environment 1000 for implementing various aspects of the claimed subject matter includes a computer 1012. In accordance with an example, super peers (e.g., super peer 206) and other peer devices (e.g., peers 208 and 210) can be the computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system that allocates backup data in a hybrid backup environment, the system comprising:
   a set of storage locations in the hybrid backup environment, the hybrid backup environment including both a cloud backup environment and a peer-to-peer backup environment; the set of storage locations including a cloud storage location of the cloud backup environment and one or more peer-to-peer storage locations of the peer-to-peer backup environment;
   wherein the cloud storage location of the cloud backup environment is remote from the one or more peer-to-peer storage locations of the peer-to-peer backup environment; and
   a super peer component, having direct interaction with both the cloud storage location of the cloud backup environment and the one or more peer storage locations of the peer-to-peer backup environment, such that the one or more peer storage locations of the peer-to-peer backup environment constitute one or more peers and the cloud storage location of the cloud backup environment is accessible to the one or more peers via a network, the super peer component including:
      a distribution component that allocates backup data among the set of storage locations in the hybrid backup environment peer devices in accordance with a priority assigned to each peer in of the peer-to-peer backup environment, wherein the distribution component allocates larger portions of backup data to peers assigned higher priorities; and
      a cloud backup component that transfers backup data from each peer of the peer-to-peer backup environment devices to the cloud storage location of the cloud backup environment.

2. The system of claim 1, further comprising a designation component that evaluates peers in the peer-to-peer backup environment to ascertain characteristics of the peers.

3. The system of claim 2, the designation component assigns a priority to each peer of the peer-to-peer backup environment based upon the ascertained characteristics.

4. The system of claim 3, the designation component promotes at least one peer from the peer-to-peer backup environment to the super peer.

5. The system of claim 4, wherein the designation component promotes a peer with a highest assigned priority to the super peer.

6. The system of claim 4, wherein the designation component selects the super peer in accordance with a policy.

7. The system of claim 4, wherein the super peer coordinates allocation of backup data among the peer-to-peer backup environment.

8. The system of claim 1, wherein the distribution component identifies a level of redundancy that specifies a number of replica copies of backup data to distribute among the peer-to-peer backup environment and the cloud backup environment.

9. The system of claim 2, wherein the characteristics include at least one of availability of a peer, connectivity of a peer, bandwidth resources of a peer, storage capacity of the peer, or processing capacity of a peer.

10. The system of claim 1, further comprising a monitor component that observes the peer-to-peer backup environment to detect modifications that affect assigned priorities.

11. The system of claim 10, the monitor component examines at least a portion of backup data to ascertain at least one of frequency of access to the portion of backup data, age of the backup data or a probability that the portion will be restored.

12. The system of claim 1, the cloud backup component transfers backup data to the cloud backup environment at off-peak times.

13. The system of claim 1, further comprising an optimization component that reduces backup data to single instance backup data.

14. A method that facilitates establishment of a hybrid backup environment, comprising:
   a plurality of peer storage locations of a peer-to-peer backup environment and a cloud storage location of a cloud backup environment;
   a processor executing computer executable instructions stored on a computer readable storage medium to implement the following acts:
   evaluating a plurality of peer storage locations of the peer-to-peer backup environment to ascertain characteristics of each peer storage location;
   designating at least one peer storage location of the plurality of peer storage locations as a super peer based at least in part on the ascertained characteristics of each peer storage location;
   wherein the super peer operates to establish a hybrid backup environment amongst the plurality of peer storage locations and the cloud backup environment based on the ascertained characteristics, the super peer further operates as an intermediary between the plurality of peer storage locations of the peer-to-peer backup environment and the cloud storage location of the cloud backup environment such that the super peer communicates with both the cloud storage location of the cloud backup environment on behalf of the plurality of peer storage locations and the plurality of peer storage locations of the peer-to-peer backup environment;
   assigning priorities to each peer storage location in the plurality of peer storage locations and distributing backup data and replica copies of backup data among the plurality of peer storage locations based at least in part on assigned priorities wherein distributing backup data comprises allocating a larger portion of backup data to peer storage locations having a highest priority
   wherein the cloud storage location of the cloud backup environment is remote from the one or more peer storage locations of the peer-to-peer backup environment and the cloud storage location is accessible to the one or more peer storage locations of the peer-to-peer backup environment via a network.

15. The method of claim 14, further comprising employing the super peer to implement the following acts:
   assigning priorities to each peer storage location in the plurality of peers;
   distributing backup data and replica copies of backup data among the plurality of peer storage locations based at least in part on assigned priorities;
   monitoring at least a piece of backup data to observe frequency of access to the piece, age of the piece or a probability of restoration of the piece; and
   transferring the piece of backup data to the cloud storage location of the cloud backup environment in accordance with the observations.

16. The method of claim 15, further comprising employing optimization on backup data prior to transference to the cloud storage location of the cloud backup environment.

17. The method of claim 15, distributing backup data comprises allocating a larger portion of backup data to peer storage locations having a highest priority.

* * * * *